I. S. & J. W. HYATT.
Apparatus and Processes for Molding Celluloids and the Compounds of Pyroxyline.
No. 152,232. Patented June 23, 1874.
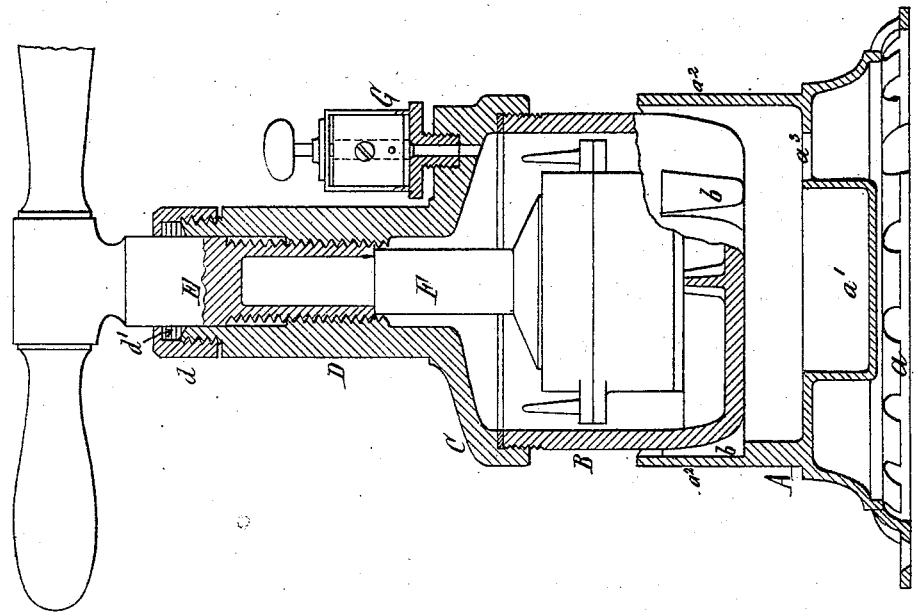
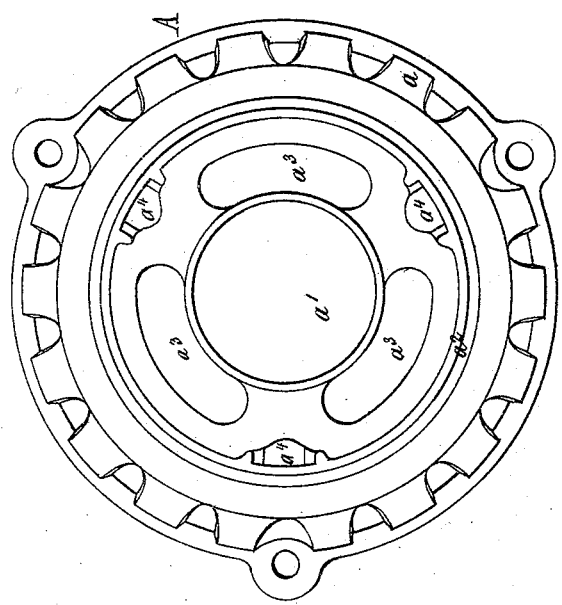

UNITED STATES PATENT OFFICE.

I. SMITH HYATT AND JOHN W. HYATT, OF NEWARK, NEW JERSEY, ASSIGNORS TO THE CELLULOID MANUFACTURING COMPANY, OF SAME PLACE.

IMPROVEMENT IN APPARATUS AND PROCESSES FOR MOLDING CELLULOIDS AND THE COMPOUNDS OF PYROXYLINE.

Specification forming part of Letters Patent No. 152,232, dated June 23, 1874; application filed May 25, 1874.

*To all whom it may concern:*

Be it known that we, I. SMITH HYATT and JOHN W. HYATT, of Newark, in the county of Essex and State of New Jersey, have invented certain Improvements in Apparatus and Process for Molding Celluloid and the Compounds of Pyroxyline, of which the following is a specification:

Our invention relates to the treatment of such compounds of converted vegetable fibers as become plastic under heat, so as to permit the same to be molded when in that state, and especially "celluloid," which is a term used as a trade-mark, and applied to a compound produced and manufactured under Letters Patents Nos. 105,338, 113,055, and 133,229, and dated, respectively, July 12, 1870, March 28, 1871, and November 19, 1872.

The inflammable nature of this material, and the ordinary compounds of pyroxyline, when raised to too high a degree of heat, in connection with other peculiar qualities, distinguish these compounds from others, so as to require, in the molding of articles therefrom, a more or less special manipulation thereof.

The molding of these compounds, or such of them as become plastic under heat, has heretofore been accomplished by placing the material in molds, (usually metallic,) and then heating the molds in an oven, or on steam-tables, whereby the material is subjected to a dry heat.

The first part of our invention consists in subjecting the material, in porous or other suitable molds, to the direct action of steam, which not only heats and softens the mass with great facility, but, by excluding the heated air therefrom, and immersing the material in steam, diminishes to a great degree the liability of combustion taking place, while it absorbs more or less of the volatile solvents remaining in the material. The second part of our invention consists in molding celluloid and the compounds of pyroxyline in a closed vessel supplied with steam, in contact with the molds and material, and provided with a safety-valve, so adjusted as to automatically regulate the pressure and temperature within the vessel, thereby dispensing with the use of a thermometer, and preventing the overheating of the material, and also preventing the bursting of the vessel, in case combustion should from any cause ensue, by the means provided for the escape of the gases resulting therefrom. The third part of our invention consists in the combination, with the vessel in which the molds are placed, of a heater arranged under the same, and provided with an open receptacle for the heating liquid, and apertures for the admission of air to support combustion, the whole being constructed as herein described.

In the accompanying drawings, Figure 1 is a vertical section of an apparatus adapted for molding plates and other small articles. Fig. 2 is a top plan view of the heater.

Like letters of reference designate like parts in each of the figures.

A is the heater, consisting of a suitable base, $a$, for supporting and securing the heater to a bed or table. The cup $a^1$ for holding the alcohol or other heating liquid, and the shield $a^2$ for inclosing the bottom or lower portion of the steam or other vessel B, in which the molds and material are heated, all cast together in one piece. $a^3$ are apertures, for the admission of air above the cup, the air being admitted under the base in any suitable manner. The shield $a^2$ is provided with vertical grooves $a^4$ in its inner surface to receive the lugs $b$ on the vessel B, by which the latter is supported at the proper height and prevented from turning in the heater. C is a screw-cap or cover for the vessel B, provided with a sleeve, D, having a screw-cap, $d$, and stuffing-box $d'$, through which passes the screw E, which works in a thread on the inside of the sleeve D. The lower end of this screw is provided with a cylindrical socket in which it fits, and by which the upper end of the platen or plunger F, by which the molds properly supported in the vessel B are forced together. G is a safety-valve, which may be of any suitable construction, adjusted to sustain such a pressure of steam as will correspond with the temperature required in the vessel. The temperature required will vary somewhat according to the quality and condition of material. The more thoroughly seasoned or dried the material the greater the temperature required.

For molding celluloid this temperature ranges from 212° to 300° Fahrenheit, and, consequently, requires a pressure of from that of the atmosphere to sixty-four pounds above.

The material to be molded is placed within the molds until softened, when the molds are gradually forced together in the ordinary manner.

What we claim as our invention is—

1. Subjecting celluloid and the compounds of pyroxyline, placed in porous or other suitable molds, to the action of steam applied in direct contact therewith during the molding process, substantially as and for the purpose hereinbefore set forth.

2. Molding celluloid and the compounds of pyroxyline, in a closed vessel supplied with steam, and provided with a safety-valve adjusted to automatically regulate the pressure and the temperature within the vessel, substantially as and for the purpose hereinbefore set forth.

3. The combination, with the heating-vessel, of the heater A, provided with cup $a^1$ and air-apertures $a^3$, as and for the purpose herein shown and described.

I. SMITH HYATT.
JOHN W. HYATT.

Witnesses to both signatures:
M. C. LEFFERTS,
S. M. THOMPSON.